US012728753B2

(12) United States Patent
Weston

(10) Patent No.: US 12,728,753 B2
(45) Date of Patent: Sep. 8, 2026

(54) SYSTEMS AND METHODS TO SUPPLY POWER FROM A VEHICLE TO INFRASTRUCTURE

(71) Applicant: Ford Global Technologies, LLC, Dearborn, MI (US)

(72) Inventor: Keith Weston, Canton, MI (US)

( * ) Notice: Subject to any disclaimer, the term of this patent is extended or adjusted under 35 U.S.C. 154(b) by 21 days.

(21) Appl. No.: 18/816,965

(22) Filed: Aug. 27, 2024

(65) Prior Publication Data

US 2026/0061872 A1 Mar. 5, 2026

(51) Int. Cl.
*B60L 53/62* (2019.01)
*B60L 53/12* (2019.01)
*H02J 50/10* (2016.01)

(52) U.S. Cl.
CPC .............. *B60L 53/62* (2019.02); *B60L 53/12* (2019.02); *H02J 50/10* (2016.02)

(58) Field of Classification Search
CPC ................................ B60L 53/12; B60L 53/62
See application file for complete search history.

(56) References Cited

U.S. PATENT DOCUMENTS 10,832,572 B2 11/2020 Cha et al.
2004/0070518 A1 4/2004 Whittle, Jr. et al.
2012/0286971 A1 11/2012 Sekiya
2019/0263289 A1 8/2019 Ortiz
2024/0042874 A1* 2/2024 Pollica .................... B60L 53/51
2025/0196689 A1* 6/2025 Lu ........................... B60L 53/66
2025/0388116 A1* 12/2025 Wilder .................. B60L 53/665

FOREIGN PATENT DOCUMENTS

CN 106023604 A 10/2016

OTHER PUBLICATIONS

Eltec, Emergency Backups for Traffic Signals, https://elteccorp.com/news/other/emergency-backups-for-traffic-signals/ Feb. 29, 2020, pp. 1-6.

* cited by examiner

*Primary Examiner* — Imran K Mustafa
(74) *Attorney, Agent, or Firm* — Frank Lollo; Eversheds Sutherland (US) LLP

(57) ABSTRACT

A system and method to supply power to external device(s) is disclosed. The system may include a vehicle having a vehicle inductive power exchange device that may be configured to operate in a vehicle reception mode and a vehicle transmission mode. In the vehicle reception mode, the device may be configured to receive power from a power source installed at a roadway and charge the vehicle electrical storage unit. In the vehicle transmission mode, the device may be configured to transmit power from the vehicle electrical storage unit to the power source, which enables the power source to supply power to an external device. The vehicle may include a processor configured to obtain a trigger signal to activate the vehicle transmission mode, and activate the vehicle transmission mode responsive to obtaining the trigger signal to transmit power from the vehicle electrical storage unit to the power source.

20 Claims, 4 Drawing Sheets

SYSTEMS AND METHODS TO SUPPLY POWER FROM A VEHICLE TO INFRASTRUCTURE

FIELD

The present disclosure relates to systems and methods to supply power from a vehicle to infrastructure such as traffic signals, grid, etc. in an event of a power outage.

BACKGROUND

In an event of a power outage, traffic signals typically turn off. Inoperable traffic signals may cause traffic congestion at intersection points and may sometimes lead to adverse scenarios.

There exist devices/systems that may be used to keep traffic signals running when there is a power outage. For example, when there is a power outage, authority personnel may carry a portable generator to a location of the inoperable traffic signal, and connect the portable generator to the traffic signal to provide power to the traffic signals. In this case, the portable generator acts as a backup power when the power supply is interrupted.

While such means do enable the traffic lights to operate in a power outage event, management and usage of portable generators may cause inconvenience to the authority personnel. In addition, the authority personnel (e.g., police officer) may need to manually direct the traffic at the intersection points to ease congestion, which may cause inconvenience to the police officer.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
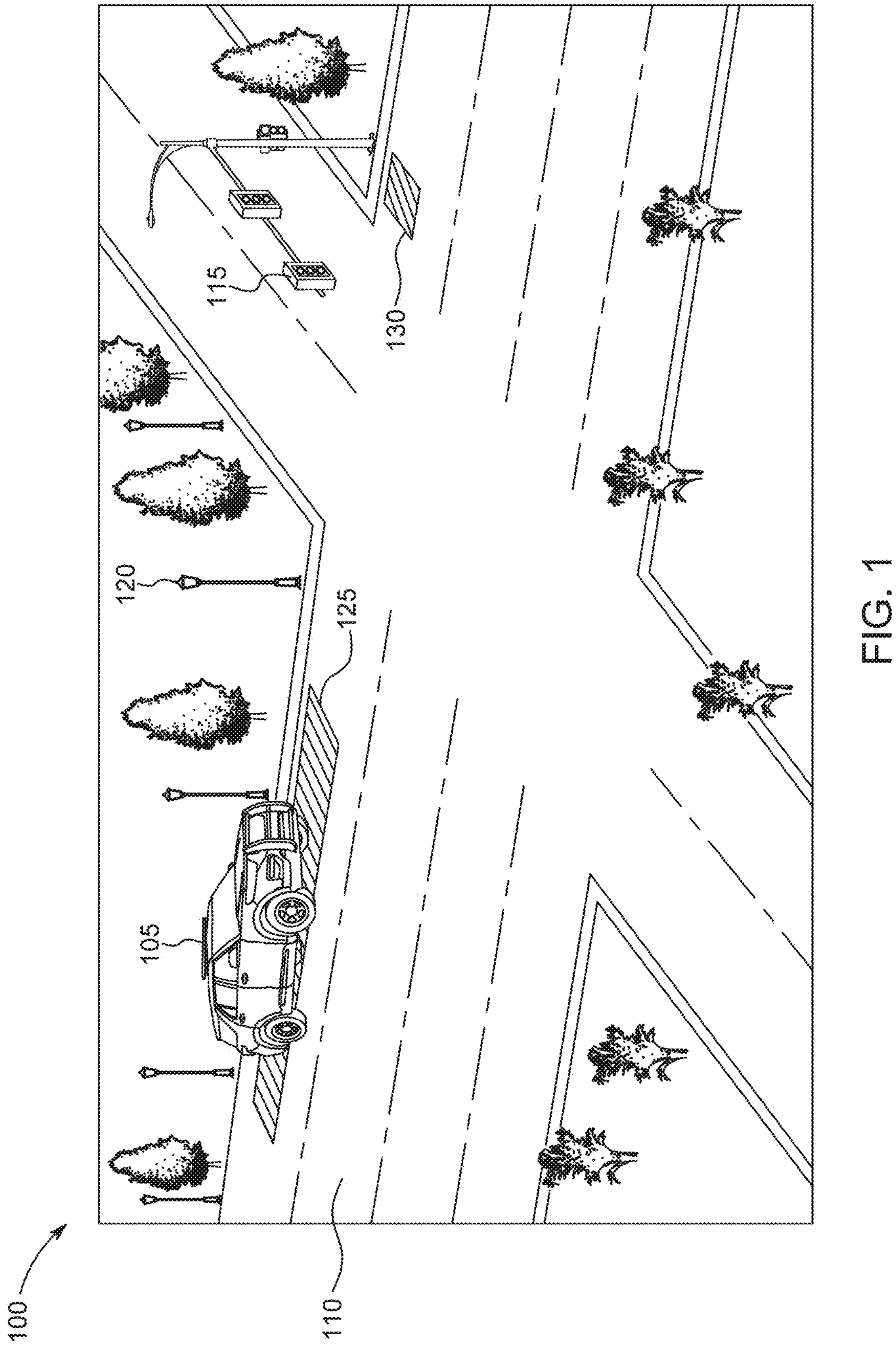
FIG. 1 depicts an example environment in which techniques and structures for providing the systems and methods disclosed herein may be implemented.

The present disclosure describes a system that may enable a vehicle to supply power to external devices such as traffic signal, street lights, grid, etc. during a power outage event. The system may utilize an induction charging system installed at a roadway to enable the vehicle to wirelessly supply power to the external devices.

In some aspects, the vehicle may include a vehicle inductive power exchange device that may be connected to a vehicle electrical storage unit (e.g., a battery). The roadway may include a roadway inductive power exchange device that may be connected with a power source (e.g., an electrical transmission line). The vehicle inductive power exchange device and the roadway inductive power exchange device may include electromagnetic coils that may facilitate power exchange between the vehicle electrical storage unit and the power source, when the two electromagnetic coils are in proximity to each other.

The vehicle inductive power exchange device may be configured to operate in a vehicle reception mode and a vehicle transmission mode. In the vehicle reception mode, the vehicle may be configured to receive power from the power source installed in the roadway. In the vehicle transmission mode, the vehicle may be configured to transmit power from the vehicle electrical storage unit to the power source, to enable the power source to supply power to the external device(s).

Similarly, the roadway inductive power exchange device may be configured to operate in a roadway transmission mode and a roadway reception mode. In the roadway transmission mode, the power source (or the roadway) may be configured to transmit power to the vehicle (or the vehicle electrical storage unit), to enable wireless vehicle charging. In the roadway reception mode, the power source may be configured to receive power from the vehicle, e.g., during power outage events.

In some aspects, when there is a power outage, the vehicle may move in proximity to a charging pad associated with the external device to be powered, and a vehicle user may initiate power transmission from the vehicle electrical storage unit to the external device via the power source installed in the roadway. In some aspects, the vehicle user may initiate the power supply by transmitting a trigger signal to the vehicle via a Human-Machine Interface (HMI) or a user device when the vehicle may be located in proximity to the charging pad associated with the external device. In this case, a vehicle processor may obtain the trigger signal to activate the vehicle transmission mode, and activate the vehicle transmission mode responsive to obtaining the trigger signal. When the vehicle transmission mode is activated, the vehicle inductive power exchange device may transmit power from the vehicle electrical storage unit to the roadway inductive power exchange device. The roadway inductive power exchange device may receive the power from the vehicle inductive power exchange device, and provide the power to the power source, which in turn may supply the power to the external device to be powered.

The present disclosure discloses a system that enables seamless traffic/street light operation in an event of a power outage. The system enables power exchange between the vehicle and the external devices during power outage events, which significantly enhances convenience of commuters using the roadways. In addition, the system facilitates the vehicle user to supply power to the external devices without requiring the vehicle user to get out of the vehicle, which enhances user convenience of supplying power to the external devices.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. FIG. 1 will be described in conjunction with FIGS. 2 and 3.

The environment 100 may include a vehicle 105 that may be a battery electric vehicle (BEV), which may be traveling on a road network or a roadway 110. The vehicle 105 may take the form of any passenger or commercial vehicle such as, for example, an off-road vehicle, a car, a crossover vehicle, a van, a minivan, a bus, a truck, etc. In some aspects, the vehicle 105 may be associated with a vehicle user (not shown). The vehicle user may be associated with authorities (e.g., police) or be a civilian. Further, the vehicle 105 may be a manually driven vehicle and/or may be configured to operate in partially or fully autonomous mode. In further aspects, the vehicle 105 may be a plug-in hybrid electric vehicle (PHEV). When the vehicle 105 is PHEV, the vehicle 105 may be equipped with an internal combustion engine that can be employed either alone or in combination with other energy sources to propel the vehicle 105.

In some aspects, the roadway 110 may include an inductive charging system that may facilitate wireless power exchange between the roadway 110 and the vehicle 105. Further, the roadway 110 may include wired power connections with external devices, and may be configured to provide power to the external devices when required. The external devices may include, but are not limited to, a traffic light or traffic signal 115, street lights 120, a grid 305 (shown in FIG. 3), and/or the like. In some aspects, the inductive charging system may enable transmission of power from the roadway 110 to the vehicle 105 (e.g., to enable wireless charging of the vehicle 105), when the vehicle 105 may be traveling (or parked) on the roadway 110. In further aspects, the inductive charging system may enable reception of power from the vehicle 105 to the roadway 110, to enable the roadway 110 to provide power to the external devices when required, e.g., during power outage events.

In some aspects, the inductive charging system may include a roadway inductive power exchange device 202 that may be connected with a power source 204 installed in the roadway 110 (e.g., under the road). The power source 204 may be configured to supply power to the roadway inductive power exchange device 202 (e.g., via power grid) during normal operating conditions, which may then supply the power to the vehicle 105 to charge the vehicle 105. In some aspects, the roadway inductive power exchange device 202 may supply power to the vehicle 105 or charge the vehicle 105 via inductive charging.

In further aspects, the power source 204 may receive power from the vehicle 105 via the roadway inductive power exchange device 202 during "special" or "abnormal" operating conditions, e.g., when there may be a power outage in the area where the roadway 110 is located. In this case, the power source 204 may supply power to the traffic signal 115, the street lights 120, the grid 305, etc. to enable normal operation of such devices during the power outage event. In some aspects, the power source 204 may include an electrical transmission line that may be disposed under a road surface. In other aspects, the power source 204 may be located above the road surface, e.g., at a road side.

The roadway inductive power exchange device 202 (or a "first inductive plate") may include first electromagnetic coils (e.g., copper coils). The roadway inductive power exchange device 202 may be laid under the road surface, and may be connected (e.g., via a wired connection) to the power source 204. In other aspects, the roadway inductive power exchange device 202 may be laid on the top of the road surface. The first electromagnetic coils may create/generate an electromagnetic field above the road surface when current from the power source 204 passes through the first electromagnetic coils. The generated electromagnetic field may facilitate exchange of power between the vehicle 105 and the power source 204, when the vehicle 105 may be traveling or be parked on the roadway 110 on top of the first electromagnetic coils/roadway inductive power exchange device 202. In this manner, the first electromagnetic coils may facilitate exchange of power between the vehicle 105 and the power source 204 magnetically. The vehicle 105 is not required to be connected via wires with the roadway inductive power exchange device 202 to enable exchange of power, and hence the roadway inductive power exchange device 202 facilitates "wireless" exchange of power between the vehicle 105 and the power source 204.

In some aspects, the roadway inductive power exchange device 202 may be installed in a portion of the roadway 110. For example, a plurality of roadway inductive power exchange devices may be installed in one lane (e.g., a charging lane 125 shown in FIG. 1) that may be used by the vehicle 105 to charge the vehicle 105 while traveling on the roadway 110. In another example, the roadway inductive power exchange device 202 may be installed at specific slots on the roadway 110 (e.g., a charging pad 130 shown in FIG. 1) that may be located on a road side or a road shoulder. The charging pad 130 may be used by the vehicle 105 to charge the vehicle 105 (or receive power from the power source 204 via the roadway inductive power exchange device 202) or to transmit power to the power source 204 via the roadway inductive power exchange device 202 to supply power to the external devices when there is a power outage event. For example, when the vehicle user desires to supply power to the traffic signal 115 in a power outage event, the vehicle user may park the vehicle 105 at the charging pad 130 (that may be located in proximity to the traffic signal 115), and may initiate power transmission from the vehicle 105 to the traffic signal 115 via the roadway 110 (e.g., via the roadway inductive power exchange device 202).

In some aspects, the roadway inductive power exchange device 202 may be configured to operate in a roadway transmission mode and a roadway reception mode. In the roadway transmission mode, the roadway inductive power exchange device 202 may be configured to transmit power from the power source 204 to the vehicle 105 (e.g., via a vehicle inductive power exchange device 208 associated with the vehicle 105, which is described later below) to charge a vehicle electrical storage unit 210. In the roadway reception mode, the roadway inductive power exchange device 202 may be configured to receive power from the vehicle 105 (e.g., from the vehicle electrical storage unit 210, via the vehicle inductive power exchange device 208) to enable the power source 204 to supply power to the external devices (e.g., the traffic signal 115, the street lights 120, etc.).

The inductive charging system (or the roadway 110) may further include a power exchange device controller 206 that may be configured to control power exchange between the roadway inductive power exchange device 202 and the vehicle 105. The power exchange device controller 206 may be communicatively coupled with the power source 204 and the roadway inductive power exchange device 202. The power exchange device controller 206 may be configured to activate/deactivate the roadway transmission mode and the roadway reception mode, based on command signals or requests obtained from the vehicle 105. In some aspects, the power exchange device controller 206 may be configured to select the roadway transmission mode or the roadway reception mode, and may activate the roadway transmission mode or the roadway reception mode based on the selection.

In some aspects, the power exchange device controller 206 may be configured to switch the mode of the roadway inductive power exchange device 202 from the roadway transmission mode (or a default mode) to the roadway reception mode based on a vehicle instruction/request signal obtained from the vehicle 105. The vehicle instruction/request signal may indicate to the power exchange device controller 206 that the vehicle user desires to transmit power from the vehicle 105 (e.g., from the vehicle electrical storage unit 210) to the roadway 110 (e.g., to the power source 204). In addition, the power exchange device controller 206 may switch the mode from the roadway transmission mode to the roadway reception mode when there is a power outage (e.g., when there is no supply of grid power from the power source 204 to the traffic signal 115, the street lights 120, etc.).

The vehicle 105 may include a plurality of components including, but not limited to, the vehicle inductive power exchange device 208, the vehicle electrical storage unit 210 (e.g., a vehicle battery), a transceiver 212, a processor 214, a memory 216, a Human-Machine Interface (HMI) 218, and/or the like. The vehicle 105 may be communicatively coupled to a server 220, via a network 222. The server 220 may be part of a cloud-based computing infrastructure and may be associated with and/or include a Telematics Service Delivery Network (SDN) that provides digital data services to the vehicle 105 and other vehicles (not shown) that may be part of a vehicle fleet. In some aspects, the server 220 may be configured to provide a server instruction/command signal to the vehicle 105 to transmit power to the external devices (such as the traffic signal 115, street lights 120, grid 305, etc.) in a power outage event. In further aspects, the server 220 may be configured to detect a power outage event, and transmit the server instruction/command signal to the vehicle 105 responsive to such detection. In some aspects, the server instruction/command signal may include instructions to move to a location associated with the external device that may require power (e.g., the traffic signal 115) and provide power to the external device. The server instruction/command signal may further include information associated with the external device. This information may include a location of the external device, an external device type (e.g., the traffic signal 115, the street lights 120, the grid 305. etc.), and/or the like.

The network(s) 222 illustrates an example communication infrastructure in which the connected devices discussed in various embodiments of this disclosure may communicate. The network(s) 222 may be and/or include the Internet, a private network, public network or other configuration that operates using any one or more known communication protocols such as transmission control protocol/Internet protocol (TCP/IP), Bluetooth®, Bluetooth Low Energy (BLE), Wi-Fi based on the Institute of Electrical and Electronics Engineers (IEEE) standard 802.11, Ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle inductive power exchange device 208 may facilitate wireless power exchange (via inductive charging) with the roadway 110 (e.g., with the inductive charging system associated with the roadway 110). In some aspects, the vehicle inductive power exchange device 208 may enable reception of power from the roadway 110 (e.g., from the power source 204, via the roadway inductive power exchange device 202) when the vehicle 105 may be traveling (or parked) on the roadway 110. In addition, the vehicle inductive power exchange device 208 may enable transmission of power from the vehicle 105 to the roadway 110 (e.g., to the power source 204, via the roadway inductive power exchange device 202) to facilitate power transmission to the external devices described above during a power outage event.

In some aspects, the vehicle inductive power exchange device 208 may be connected with the vehicle electrical storage unit 210. The vehicle electrical storage unit 210 may be a vehicle battery (e.g., a traction battery) that may be configured to receive power from the roadway 110 (e.g., from the power source 204 via the induction charging system) via the generated electromagnetic field, as described above. In further aspects, the vehicle electrical storage unit 210 may transmit power to the roadway 110 (e.g., to the power source 204) when there is a power outage event.

Figure 2:
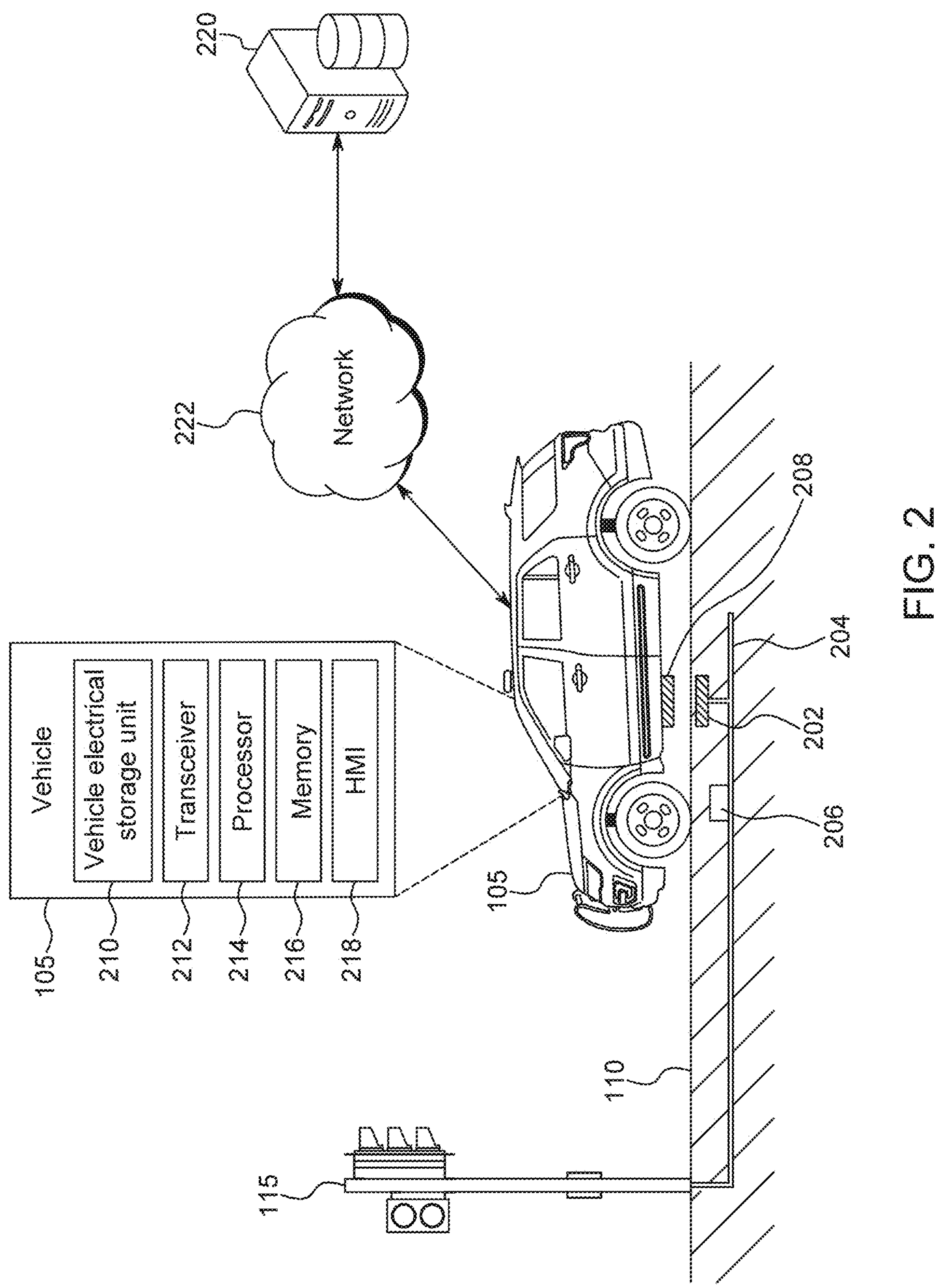
FIG. 2 depicts an example system to supply power to traffic signals in accordance with the present disclosure.
Figure 3:
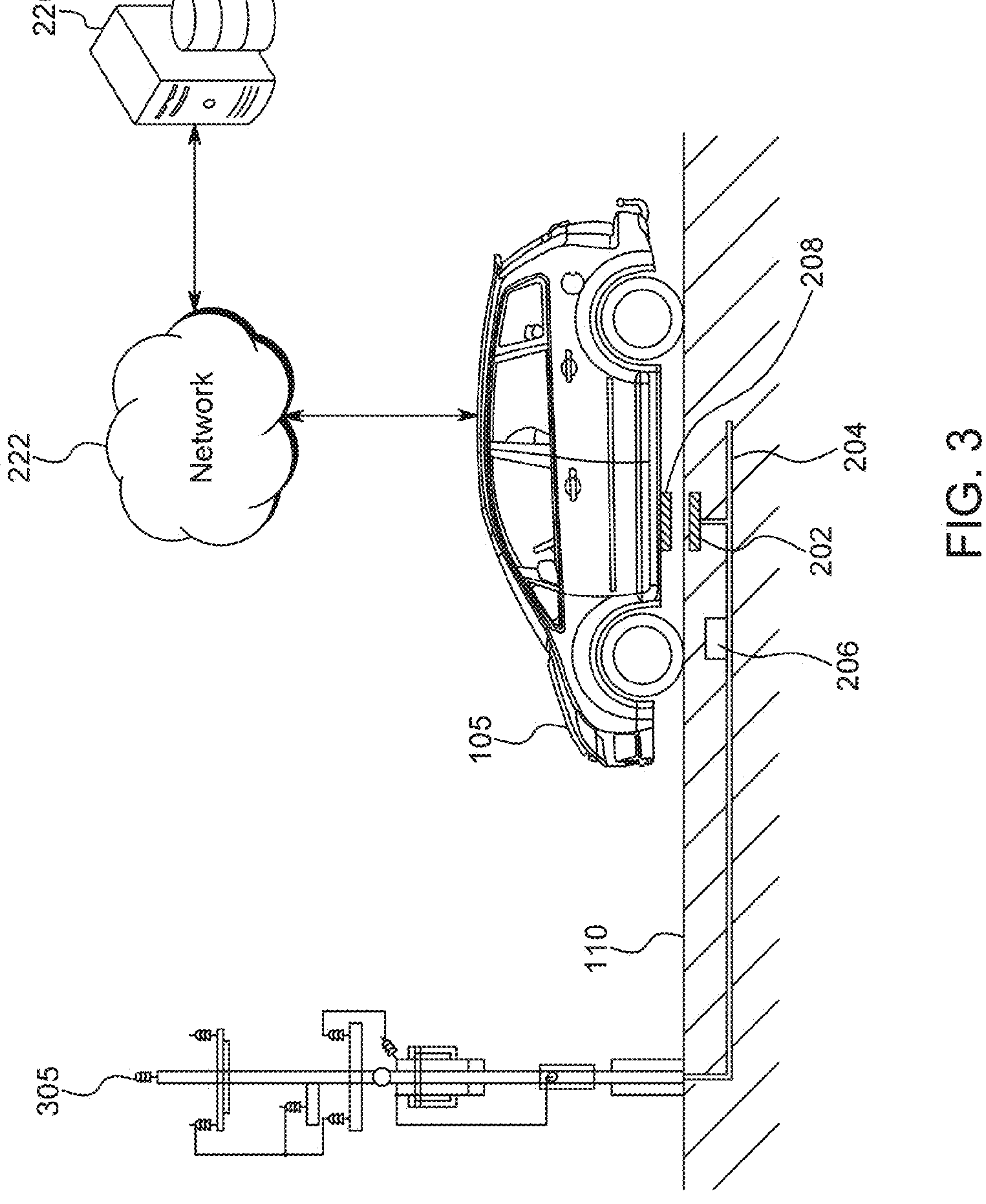
FIG. 3 depicts an example system to supply power to a grid via a roadway in accordance with the present disclosure.

The vehicle inductive power exchange device 208 (or a "second inductive plate") may include second electromagnetic coils (or copper coils). In some aspects, the vehicle inductive power exchange device 208 may be located beneath a vehicle undercarriage (or at a vehicle bottom surface, as shown in FIG. 2), and may be connected to the vehicle electrical storage unit 210, e.g., via a wired connection. The first electromagnetic coils (included in the roadway inductive power exchange device 202) and the second electromagnetic coils (included in the vehicle inductive power exchange device 208) may facilitate exchange of power magnetically or via induction between the roadway 110 (e.g., the inductive charging system) and the vehicle 105, when the vehicle 105 may be traveling or parked on the roadway 110.

In some aspects, the vehicle inductive power exchange device 208 may be configured to operate in a vehicle reception mode and a vehicle transmission mode. In the vehicle reception mode, the vehicle inductive power exchange device 208 may be configured to wirelessly receive power from the power source 204 (e.g., via the roadway inductive power exchange device 202) and charge the vehicle electrical storage unit 210. In the vehicle transmission mode, the vehicle inductive power exchange device 208 may be configured to wirelessly transmit power from the vehicle electrical storage unit 210 to the power source 204 (e.g., via the roadway inductive power exchange device 202) to enable the power source 204 to supply power to the external devices described above, e.g., during a power outage event.

The transceiver 212 may be configured to receive information/inputs from one or more devices or systems. For example, the transceiver 212 may be configured to receive server instruction/command signal from the server 220. In addition, the transceiver 212 may be configured to receive a request to transmit power from the vehicle 105 to the roadway 110 (e.g., from the vehicle electrical storage unit 210 to the power source 204) from a vehicle driver/user, via a user interface (e.g., via the HMI 218 or a user device associated with the vehicle driver). The user device may be, for example, a mobile device, a laptop, a tablet, a smartwatch, or any other device having communication capability. In addition, the transceiver 212 may be configured to transmit the vehicle instruction/request to the power exchange device controller 206. For example, the transceiver 212 may transmit a signal to the power exchange device controller 206, which may cause the power exchange device controller 206 to activate the roadway reception mode of the roadway inductive power exchange device 202 (to receive power from the vehicle 105).

The processor 214 may be disposed in communication with one or more memory devices disposed in communication with the respective computing systems (e.g., the memory 216 and/or one or more external databases not shown). The processor 214 may utilize the memory 216 to store programs in code and/or to store data for performing aspects in accordance with the disclosure. The memory 216 may be a non-transitory computer-readable storage medium or memory storing a charging management program code. The memory 216 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In operation, when the vehicle 105 may be traveling on the charging lane 125 or parked on the charging pad 130, the processor 214 may activate the vehicle reception mode to wirelessly charge the vehicle 105 (e.g., via the power source 204 and the roadway inductive power exchange device 202). In some aspects, the processor 214 may receive inputs from a first detector (e.g., a first induction loop detector), and determine that the vehicle 105 may be traveling on the charging lane 125 or parked on the charging pad 130 based on the inputs. Responsive to such determination, the processor 214 may activate the vehicle reception mode. The processor 214 may deactivate the vehicle reception mode when the vehicle 105 may not be traveling on the charging lane 125 or not parked on the charging pad 130. In further aspects, when the vehicle 105 may be traveling on the charging lane 125 or parked on the charging pad 130, the power exchange device controller 206 may activate the roadway transmission mode. In some aspects, the power exchange device controller 206 may receive inputs from a second detector (e.g., a second induction loop detector), and determine that the vehicle 105 may be traveling on the charging lane 125 or parked on the charging pad 130 based on the inputs. Responsive to such determination, the power exchange device controller 206 may activate the roadway transmission mode. When the vehicle 105 is operating in the vehicle reception mode and the roadway 110 is operating in the roadway transmission mode, power may be transferred from the roadway 110 to the vehicle 105 (e.g., from the power source 204 to the vehicle electrical storage unit 210), which may enable the vehicle 105 to charge wirelessly.

When there may be a power outage, the vehicle user (e.g., police or civilian) may move the vehicle 105 in proximity to the external device such as the traffic signal 115, and may park the vehicle 105 on the charging pad 130 that may be located in proximity to the traffic signal 115. When the vehicle 105 may be parked on the charging pad 130 (or when the charging pad 130 may be aligned with the vehicle inductive power exchange device 208), the vehicle user may initiate a power transmission from the vehicle 105 to the roadway 110 (e.g., to the roadway inductive power exchange device 202 associated with the charging pad 130). In some aspects, the vehicle user may use the user interface (e.g., the HMI 218 or the user device) to initiate the power transmission from the vehicle 105 to the roadway 110.

When the vehicle user initiates the power transmission via the HMI 218 or the user device, the processor 214 may obtain a trigger signal to activate the vehicle transmission mode. Since the vehicle user initiates the power transmission when there is a power outage event, the processor 214 may obtain the trigger signal when there is a power outage event. Responsive to obtaining the trigger signal, the processor 214 may activate the vehicle transmission mode to transmit power from the vehicle electrical storage unit 210 to the power source 204 (via the roadway inductive power exchange device 202 and vehicle inductive power exchange device 208), which enables the power source 204 to supply power to the traffic signal 115.

In some aspects, the processor 214 may transmit a vehicle instruction/request signal to the power exchange device controller 206 to activate the roadway reception mode, when the processor 214 activates the vehicle transmission mode (or before activating the vehicle transmission mode). The power exchange device controller 206 may be configured to obtain the vehicle instruction/request signal from the vehicle 105 in an event of a power outage (e.g., via the network 222), and activate the roadway reception mode responsive to obtaining the request signal. Power may be transferred from the vehicle 105 to the roadway 110 (e.g., from the vehicle electrical storage unit 210 to the power source 204), when the vehicle inductive power exchange device 208 is operating in the vehicle transmission mode and the roadway inductive power exchange device 202 is operating in the roadway reception mode.

In some aspects, responsive to obtaining the trigger signal from the HMI 218 or the user device, the processor 214 may switch the operation mode of the vehicle inductive power exchange device 208 from the vehicle reception mode to the vehicle transmission mode (e.g., if the vehicle reception mode was activated earlier). Similarly, responsive to obtaining the vehicle instruction/request signal from the vehicle 105, the power exchange device controller 206 may switch operation mode of the roadway inductive power exchange device 202 from the roadway transmission mode to the roadway reception mode, to facilitate the vehicle 105 to supply power to the traffic signal 115 via the power source 204.

Although the description above describes an aspect where the processor 214 obtains the trigger signal from the vehicle user via the HMI 218 or the user device, the present disclosure is not limited to such an aspect. In other aspects, the processor 214 may obtain the trigger signal from the server 220, when the processor 214 receives the server instruction/command signal from the server 220. The processor 214 may activate the vehicle transmission mode responsive to obtaining the trigger signal from the server 220. When the vehicle transmission mode is activated, the vehicle inductive power exchange device 208 may transmit power from the vehicle electrical storage unit 210 to the roadway inductive power exchange device 202, and the roadway inductive power exchange device 202 may receive the power and provide the power to the power source 204. To receive the power from the vehicle 105, the power exchange device controller 206 may activate the roadway reception mode of the roadway inductive power exchange device 202. In some aspects, the processor 214 and the power exchange device controller 206 may control flow of power between the vehicle electrical storage unit 210 and the power source 204.

In the aspect where the processor 214 obtains the trigger signal from the server 220, the processor 214 may cause the vehicle 105 to autonomously move in proximity to the external device such as the traffic signal 115, to initiate power transmission from the vehicle 105 to the roadway 110, based on the server instruction/command signal (e.g., when the vehicle 105 may be an autonomous vehicle). In such cases, the processor 214 may cause the vehicle 105 to move in proximity to the external device responsive to obtaining the trigger signal from the server 220. As described above, the trigger signal or the server instruction/command signal obtained from the server 220 includes the information associated with the location of the external device, which may facilitate the vehicle 105 to autonomously move towards the external device.

The processor 214 may activate the vehicle transmission mode when the vehicle 105 may be located in proximity to the external device (e.g., at the charging pad 130 located in proximity to the traffic signal 115).

In a similar manner as described above, the processor 214 may obtain the trigger signal from the server 220 or the HMI 218/user device to supply power to the street lights 120 or the grid 305, via the roadway 110. The grid 305 may obtain the power supply from the vehicle 105, and may further supply power to other equipment/devices such as other vehicles, street lights 120, homes, other buildings, etc.

In further aspects, the processor 214 may deactivate the vehicle transmission mode based on a user request obtained via the HMI 218 or the user device. In additional aspects, the processor 214 may deactivate the vehicle transmission mode when the State of Charge (SoC) level associated with the vehicle electrical storage unit 210 is less than a predefined threshold. In yet another aspect, the processor 214 may deactivate the vehicle transmission mode when the vehicle 105 moves away from the charging pad 130. In some aspects, the traffic signal 115 may include a battery and/or capacitor to continue operation even when the vehicle 105 may not be supplying power to the traffic signal 115 (and the power from the power grid is not yet restored).

The vehicle 105 may implement and/or perform operations, as described here in the present disclosure, in accordance with the owner manual and safety guidelines. In addition, any action taken by the vehicle user based on the notifications/recommendations provided by the vehicle 105 should comply with all the rules specific to the vehicle location and vehicle operation (e.g., Federal, state, country, city, etc.). The notifications/recommendations, as provided by the vehicle 105, should be treated as suggestions and only followed according to any rules specific to the vehicle location and vehicle operation.

Figure 4:
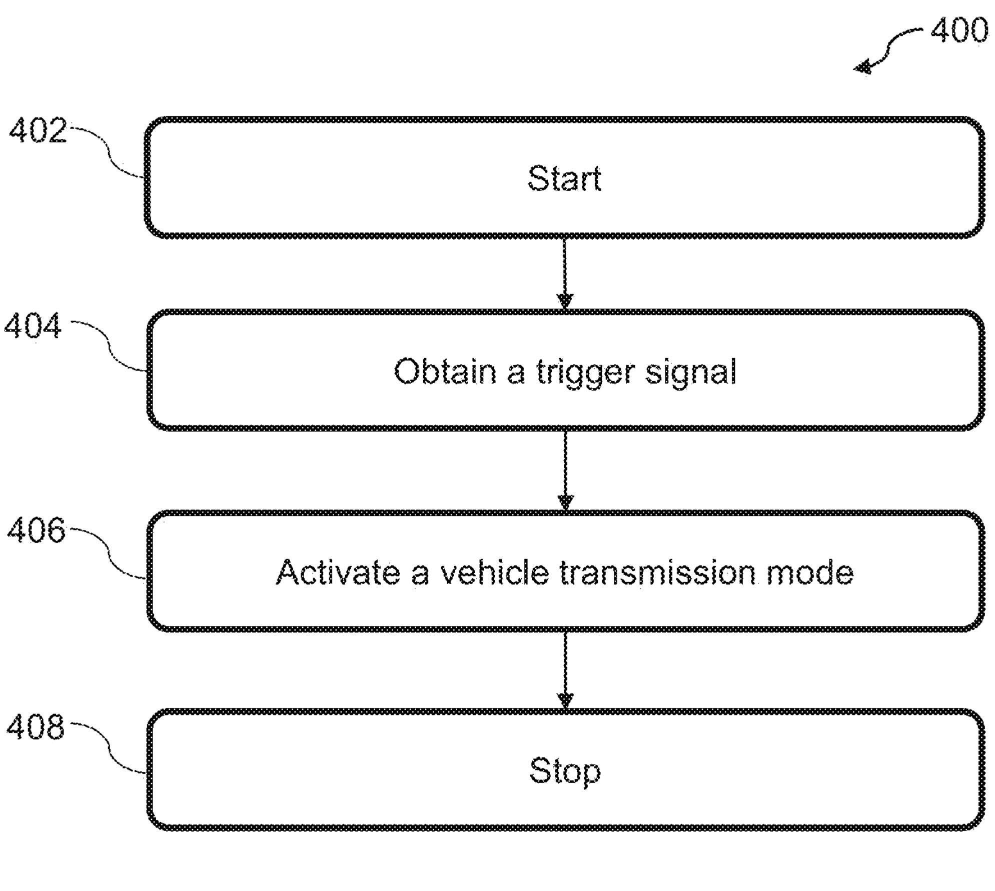
FIG. 4 depicts a flow diagram of an example method for supply power to external device(s) in accordance with the present disclosure.

FIG. 4 depicts a flow diagram of an example method 400 for supply power to external device(s) in accordance with the present disclosure. FIG. 4 may be described with continued reference to prior figures, including FIGS. 1-3. The following process is exemplary and not confined to the steps described hereafter. Moreover, alternative embodiments may include more or less steps than are shown or described herein and may include these steps in a different order than the order described in the following example embodiments.

At step 402, the method 400 may commence. At step 404, the method 400 may include obtaining, by the processor 214, a trigger signal to activate the vehicle transmission mode of the vehicle inductive power exchange device 208. At step 406, the method 400 may include activating, by the processor 214, the vehicle transmission mode responsive to obtaining the trigger signal. As described above, the vehicle 105 may be able to transmit power from the vehicle electrical storage unit 210 to the power source 204 via the roadway inductive power exchange device 202 when the vehicle transmission mode is activated. In some aspects, the processor 214 may transmit the vehicle instruction/request to the power exchange device controller 206 when the vehicle transmission mode is activated, which may cause the power exchange device controller 206 to activate the roadway reception mode of the roadway inductive power exchange device 202 (to receive power from the vehicle 105).

At step 408, the method 400 may stop.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:

a vehicle electrical storage unit;

a vehicle inductive power exchange device connected with the vehicle electrical storage unit, wherein:

the vehicle inductive power exchange device is configured to operate in a vehicle reception mode and a vehicle transmission mode, the vehicle inductive power exchange device is configured to receive power from a power source installed at a roadway and charge the vehicle electrical storage unit in the vehicle reception mode, and the vehicle inductive power exchange device is configured to transmit power from the vehicle electrical storage unit to the power source in the vehicle transmission mode; and a processor configured to:

obtain a request to transmit power from the vehicle electrical storage unit to the power source, wherein the request is indicative of an existing power outage associated with the power source and impacting one or more external devices comprising a traffic signal;

obtain, responsive to obtaining the request, a trigger signal to activate the vehicle transmission mode; and activate, responsive to obtaining the trigger signal, the vehicle transmission mode to transmit power from the vehicle electrical storage unit to the power source, which enables the power source to supply power to the one or more external devices.

2. The vehicle of claim 1, wherein the vehicle inductive power exchange device is configured to receive or transmit the power from or to the power source via a roadway inductive power exchange device installed at the roadway.

3. The vehicle of claim 2, wherein the vehicle inductive power exchange device comprises first electromagnetic coils, wherein the roadway inductive power exchange device comprises second electromagnetic coils, and wherein the first electromagnetic coils and the second electromagnetic coils exchange power via induction.

4. The vehicle of claim 2, wherein the processor is further configured to transmit, responsive to activating the vehicle transmission mode, a vehicle request signal to a power exchange device controller, installed at the roadway, to activate a roadway reception mode of the roadway inductive power exchange device, and wherein the roadway inductive power exchange device is configured to receive power from the vehicle electrical storage unit via the vehicle inductive power exchange device in the roadway reception mode.

5. The vehicle of claim 1, wherein the one or more external devices further comprises a street light or a grid.

6. The vehicle of claim 1, wherein the processor is configured to obtain the trigger signal from a user interface of the vehicle.

7. The vehicle of claim 1, wherein the processor is further configured to obtain the trigger signal from a server.

8. The vehicle of claim 1, wherein the processor is configured to obtain the trigger signal from a user device associated with a vehicle user of the vehicle.

9. The vehicle of claim 1, wherein the processor is further configured to cause the vehicle to move in proximity to the one or more external devices to initiate power transmission from the vehicle electrical storage unit to the power source, responsive to obtaining the trigger signal.

10. The vehicle of claim 9, wherein the processor is further configured to activate the vehicle transmission mode when the vehicle is located in proximity to the one or more external devices.

11. The vehicle of claim 8, wherein the vehicle is an autonomous vehicle.

12. The vehicle of claim 1, wherein the vehicle is a battery electric vehicle.

13. A system comprising:

a power source;

a roadway inductive power exchange device connected with the power source, wherein:

the roadway inductive power exchange device is configured to operate in a roadway transmission mode and a roadway reception mode, the roadway inductive power exchange device is configured to transmit power from the power source to a vehicle to charge a vehicle electrical storage unit in the roadway transmission mode, and the roadway inductive power exchange device is configured to receive power from the vehicle electrical storage unit in the roadway reception mode, to enable the roadway inductive power exchange device to supply power to one or more external devices comprising a traffic signal; and a power exchange device controller that is communicatively coupled to the roadway inductive power exchange device and the power source, wherein:

the power exchange device controller is configured to activate the roadway transmission mode or the roadway reception mode;

the power exchange device controller is configured to generate a request to transmit power from the vehicle electrical storage unit to the power source, wherein the request is indicative of an existing power outage associated with the power source and impacting the one or more external devices;

the power exchange device controller is configured to obtain, from the vehicle and corresponding to the request to transmit power, a request to activate the roadway reception mode;

the power exchange device controller is configured to activate the roadway reception mode in response to obtaining the request to activate the roadway reception mode.

14. The system of claim 13, wherein the roadway inductive power exchange device is configured to receive or transmit the power from or to the vehicle electrical storage unit via a vehicle inductive power exchange device installed in the vehicle.

15. The system of claim 14, wherein the vehicle inductive power exchange device comprises first electromagnetic coils and the roadway inductive power exchange device comprises second electromagnetic coils, and wherein the first electromagnetic coils and the second electromagnetic coils exchange power via induction.

16. The system of claim 13, wherein the one or more external devices further comprises a street light or a grid.

17. The system of claim 13, wherein the system is installed at a roadway.

18. The system of claim 13, wherein the power exchange device controller is further configured to control flow of power between the vehicle electrical storage unit and the power source.

19. The system of claim 13, wherein the power exchange device controller is further configured to:

generate instructions for the vehicle to move to a location associated with the one or more external devices.

20. A method comprising:

obtaining, by a processor, a request to transmit power from a vehicle electrical storage unit of a vehicle to a power source installed at a roadway, wherein the request is indicative of an existing power outage associated with the power source and impacting one or more external devices comprising a traffic signal;

obtaining, by the processor and responsive to obtaining the request, a trigger signal to activate a vehicle transmission mode of a vehicle inductive power exchange device associated with the vehicle, wherein:

the vehicle inductive power exchange device is connected with the vehicle electrical storage unit, the vehicle inductive power exchange device is configured to operate in a vehicle reception mode and the vehicle transmission mode, the vehicle inductive power exchange device is configured to receive power from the power source installed and charge the vehicle electrical storage unit in the vehicle reception mode, and the vehicle inductive power exchange device is configured to transmit power from the vehicle electrical storage unit to the power source in the vehicle transmission mode, and activating, by the processor, the vehicle transmission mode responsive to obtaining the trigger signal to transmit power from the vehicle electrical storage unit to the power source, which enables the power source to supply power to the one or more external devices.

* * * * *